Sept. 4, 1934.    J. KOPAY    1,972,659

AUTOMATIC BRAKE APPLYING DEVICE

Filed Dec. 17, 1932    2 Sheets-Sheet 1

Inventor
John Kopay

By Clarence A. O'Brien
Attorney

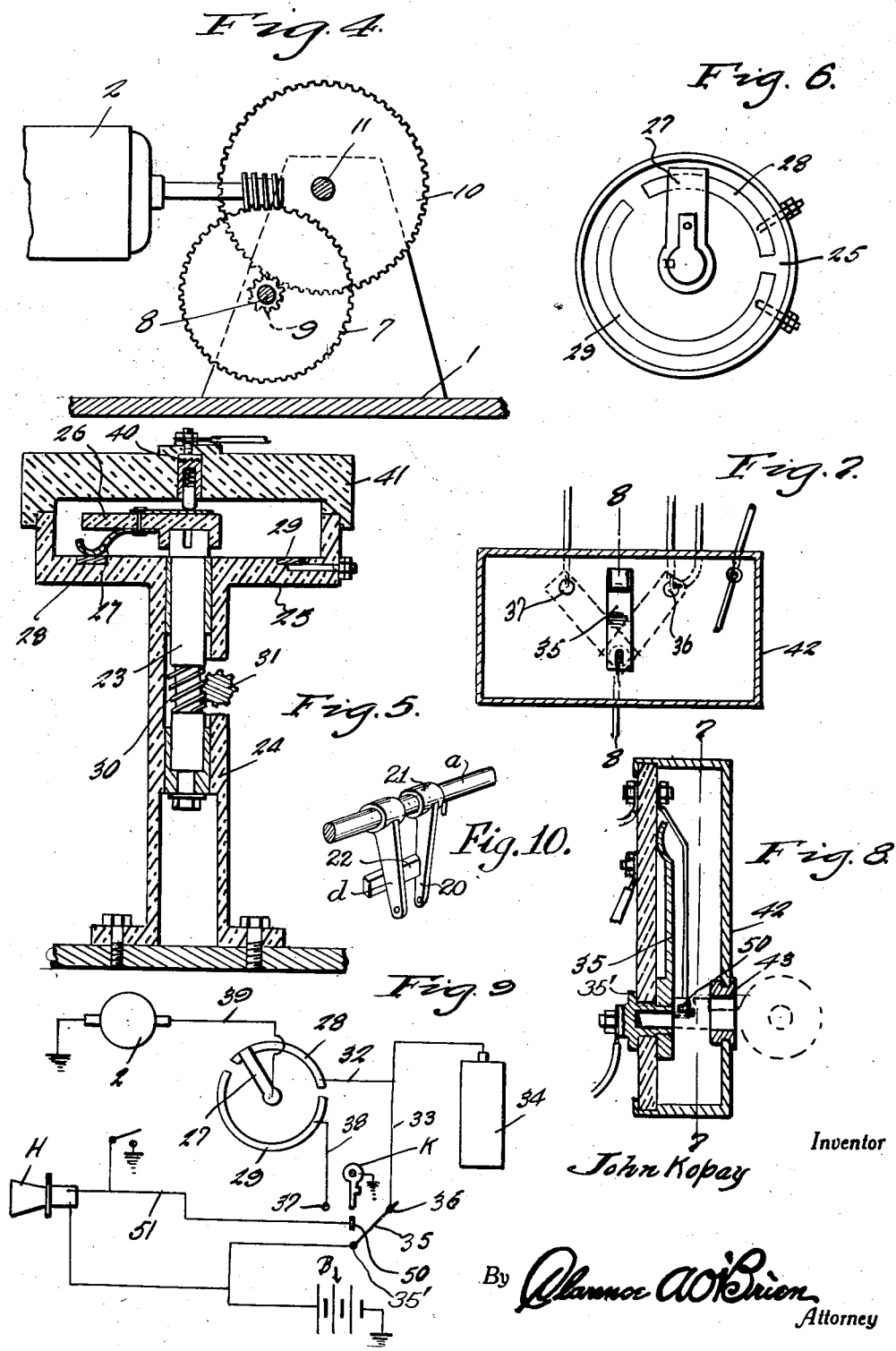

Patented Sept. 4, 1934

1,972,659

UNITED STATES PATENT OFFICE 1,972,659

AUTOMATIC BRAKE APPLYING DEVICE

John Kopay, Duquesne, Pa.

Application December 17, 1932, Serial No. 647,808

3 Claims. (Cl. 192—2)

This invention relates to an automatic brake applying device for motor vehicles, the general object of the invention being to provide means for automatically applying the brakes of a vehicle when the ignition circuit of the motor of the vehicle is turned off and for releasing the brakes when the ignition circuit is closed, without interfering with the application of the brakes by the usual manually operated means.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Fig. 4 is a section on line 4—4 of Fig. 2.

Fig. 5 is a section on line 5—5 of Fig. 2.

Fig. 6 is a plan view of Fig. 5 with the cap removed.

Fig. 7 is a section on line 7—7 of Fig. 8.

Fig. 8 is a section on line 8—8 of Fig. 7.

Fig. 9 is a diagrammatic view of the circuit.

Figure 10 is a detail view showing the arrangement of the collars on the brake operating shaft, with the pin carried by one of the collars.

Figure 1:
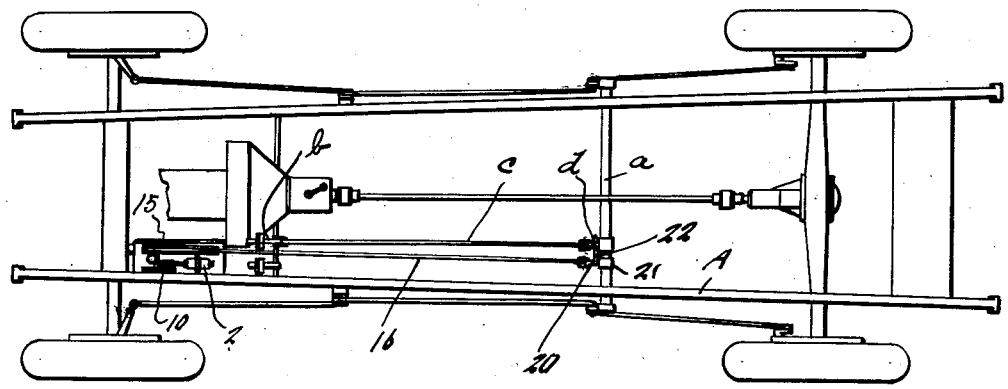
Figure 1 is a plan view of the chassis of an automobile showing the invention in use thereon.
Figure 2:
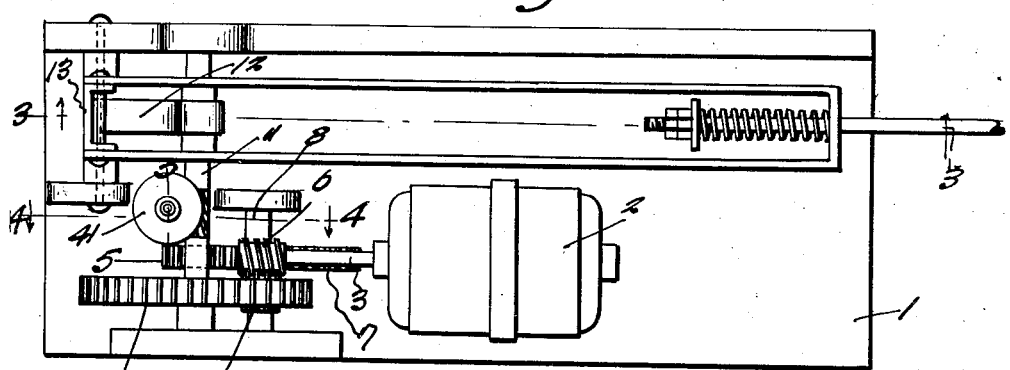
Fig. 2 is a plan view of the invention.

In these drawings, the chassis of the vehicle is shown at A and the brake shaft at $a$, this shaft being connected to the brake pedal $b$ by the link $c$ which is connected to the arm $d$ fastened by a collar or the like to the shaft $a$.

In carrying out my invention I provide a support 1 which is suitably connected with the chassis frame and on which is mounted a motor 2 the shaft 3 of which carries a worm 6 which meshes with a worm gear 7 on a shaft 8 journalled on the support 1. This shaft 8 carries a pinion 9 which meshes with a gear 10 on a shaft 11 also journalled from the support 1 and having a cam 12 attached thereto. An upright arm 13 has its lower end pivotally connected to the support 1 as shown at 14, and is so positioned as to be engaged by the cam 12 when the shaft 11 is rotated from the motor and a frame 15 has one end connected with the upper end of the arm 13 so that the frame 15 moves with the arm and a rod 16 passes through a hole in the rear end of the frame, this rod carrying a spring 17 which has one end bearing against the rear end of the frame 15 and its other end engages a washer 18 held in place on the front end of the rod 16 by the nuts 19. The rear end of the rod 16 is connected to an arm 20 attached to a collar 21 loosely arranged on the shaft $a$ and said arm 20 carries a pin 22 which is located over the brake arm $d$. Thus when the cam engages the arm 13 and moves the same forwardly the frame 15 will exert a pull upon the rod 16 through means of the spring 17 and the washers and nuts so that the arm 20 is swung forwardly which causes the pin 22 to engage the arm $d$ and thus the shaft $a$ is rocked to apply the brakes. By using this pin 22, the shaft $a$ can be rocked from the pedal $b$ through means of the link $c$ without interference from the parts forming the subject matter of this invention.

Figure 3:
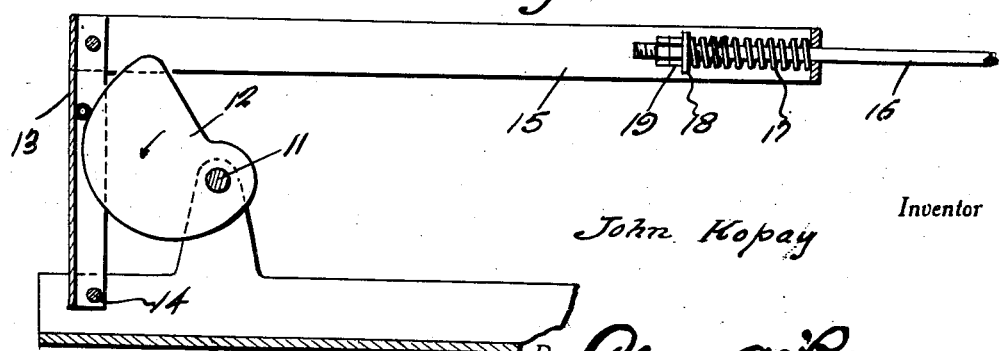
Fig. 3 is a section on line 3—3 of Fig. 2.

From the foregoing it will be seen that when the motor moves the cam 12 against the arm 13, to move said arm 13 forwardly, the brake will be applied but when the motor moves the cam out of engagement with said arm the springs of the brake mechanism will move the brakes to releasing position in the ordinary manner. The cam 12 moves in the direction of the arrow in Figure 3, and said cam, during a part of its revolution, will engage the arm to swing the same forwardly to apply the brakes and then the motor comes to rest with the cam holding the arm in a position with the brakes applied. When the circuit to the motor is again closed, the cam moves out of engagement with the arm so that the brakes are released, after which the circuit of the motor is broken and the cam is in a position where it will not engage the arm 13. Thus during one operation of the motor, the cam is moved to force the arm 13 forwardly and the motor stops with the cam holding the arm in its forward position and then on the next operation of the motor, the cam is moved out of engagement with the arm and the motor stops with the cam still out of contact with the arm.

A vertically arranged shaft 23 is journalled in the vertically arranged tubular part 24 supported from the member 1 and having a casing 25 at its upper end. An arm 26 is attached to the upper end of the shaft 23 and carries a spring wiper 27 for engaging the two substantially semi-circular contact members 28 and 29 embedded in the bottom of the casing 25 and spaced apart as shown. The shaft 23 carries a worm 30 which is engaged by a worm 31 formed on the shaft 11 which carries the cam 12 so that said shaft 23 and its arm 26 are rotated from the motor.

As shown in Fig. 9, a conductor 32 connects the contact 28 with the ignition circuit 33 leading to the coil 34 from the switch 35. As shown in Fig. 9 when the switch arm 35 is in a position closing the ignition circuit 33, it engages the contact 36 and when the switch arm is in its second position opening the ignition circuit, it engages a contact 37 which is connected by a conductor 38 with the contact 29. Thus when the ignition circuit is closed, contact 28 is connected with the battery B and when the ignition circuit is broken the contact 29 is connected with the battery.

The spring 27 of the arm 26 is connected electrically with the motor by means of the conductor 39 and the brush means shown generally at 40 in the cap 41 of the casing 25.

Figs. 7 and 8 show the ignition switch placed in a casing 42 with the switch arm 35 adapted to be moved by a key inserted through the key hole 43 in said casing 42.

Thus it will be seen that when the key is turned to break the ignition circuit, the switch arm 35 is moved into engagement with the contact 37 which completes the circuit to the contact 29 and as the spring 27 of the arm 26 is in engagement with this contact 29, the circuit to the motor 2 is completed from the battery through the switch 35 and contact 37, conductor 38, contact 29, spring 27, brush 40 and conductor 39 so that the motor will turn the shaft 11 through means of the gearing shown and thus cause the cam 12 to rock the arm 13 so as to move the frame 15 and rod 16 to cause the pin 22 to engage the arm d of the shaft a and thus apply the brakes. At the same time the shaft 23 is being rotated from the motor so as to move the spring 27 and the arm 26 over to contact 29 until the spring 27 moves off the contact 29 onto the contact 28 and the circuit to the motor 2 is broken and the parts come to rest with the brakes applied.

When the key is inserted and turned to move the switch arm to a position to engage the contact 36 to close the ignition circuit, current will flow through the conductor 32 into the contact 28 and through the spring 27 and conductor 39 to the motor 2 so that the motor will start and thus turn the shaft 11 through the gearing, and thus the cam 12 will be turned to the position where it will free the arm 13 so that the brakes will be released by their springs and the arm 26 carrying the spring 27 will move off the contact 28 onto the contact 29 so as to break the circuit to the motor 2 and place the parts in a position where the circuit to the motor 2 will be closed again when the switch 35 is moved to break the ignition circuit and complete the circuit to the motor 2 through the contact 37 and the conductor 38.

Thus it will be seen that I have provided simple means for automatically applying the brakes of a vehicle when the ignition circuit of the motor thereof is broken and to automatically release the brakes when the ignition circuit is closed again.

I also provide means for sounding the horn H of the vehicle when a key, other than the regular key for which the ignition lock is made, is used. When such an unauthorized key, shown at K is inserted in the key hole, it will strike the contact 50 and thus close the circuit 51 to the horn, the key being grounded by contacting the terminal 35′ which also forms the pivot for the switch 35. The regular key will not strike this contact 50 so that this regular key will not close the horn circuit.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. In a motor vehicle including an ignition system and a brake system, an arm pivotally supported on a part of the vehicle, a frame connected with the arm, a rod connected with the frame and having a part thereon engaging a part of the brake mechanism for applying the brakes when said arm is rocked on its pivot, a cam for rocking the said arm, a motor, means operated thereby for actuating the cam, a circuit for the motor including a pair of arcuate contacts spaced apart and a rotary member having a contact arm thereon engaging the arcuate contacts, means for closing the said circuit through one of the arcuate contacts when the ignition circuit is opened, means for closing the said motor circuit through the other arcuate contact when the ignition circuit is closed, and means for operating the rotary member from the motor.

2. In a motor vehicle including an ignition system and a brake system, an arm pivotally supported on a part of the vehicle, a frame connected with the arm, a rod connected with the frame and having a part thereon engaging a part of the brake mechanism for applying the brakes when said arm is rocked on its pivot, a cam for rocking the said arm, a motor, means operated thereby for actuating the cam, a circuit for the motor including a pair of arcuate contacts spaced apart and a rotary member having a contact arm thereon engaging the arcuate contact, means for closing the said circuit through one of the arcuate contacts when the ignition circuit is opened, means for closing the said motor circuit through the other arcuate contact when the ignition circuit is closed, and means for operating the rotary member from the motor, such means including worm gearing.

3. In a motor vehicle including an ignition system and a brake system, means for automatically applying the brakes when the ignition circuit is opened and for releasing the brakes when the circuit is closed, said means including a motor and a circuit for the motor including a pair of arcuate contacts spaced apart and a rotary member having a contact arm thereon engaging said arcuate contacts, means for closing the motor circuit through one of the arcuate contacts when the ignition circuit is open, means for closing the motor circuit through the other arcuate contact when the ignition circuit is closed and means for operating the rotary member from the motor.

JOHN KOPAY.